March 5, 1940.  H. W. JONES  2,192,662
GAS REGULATING APPARATUS
Filed April 27, 1938    2 Sheets-Sheet 1
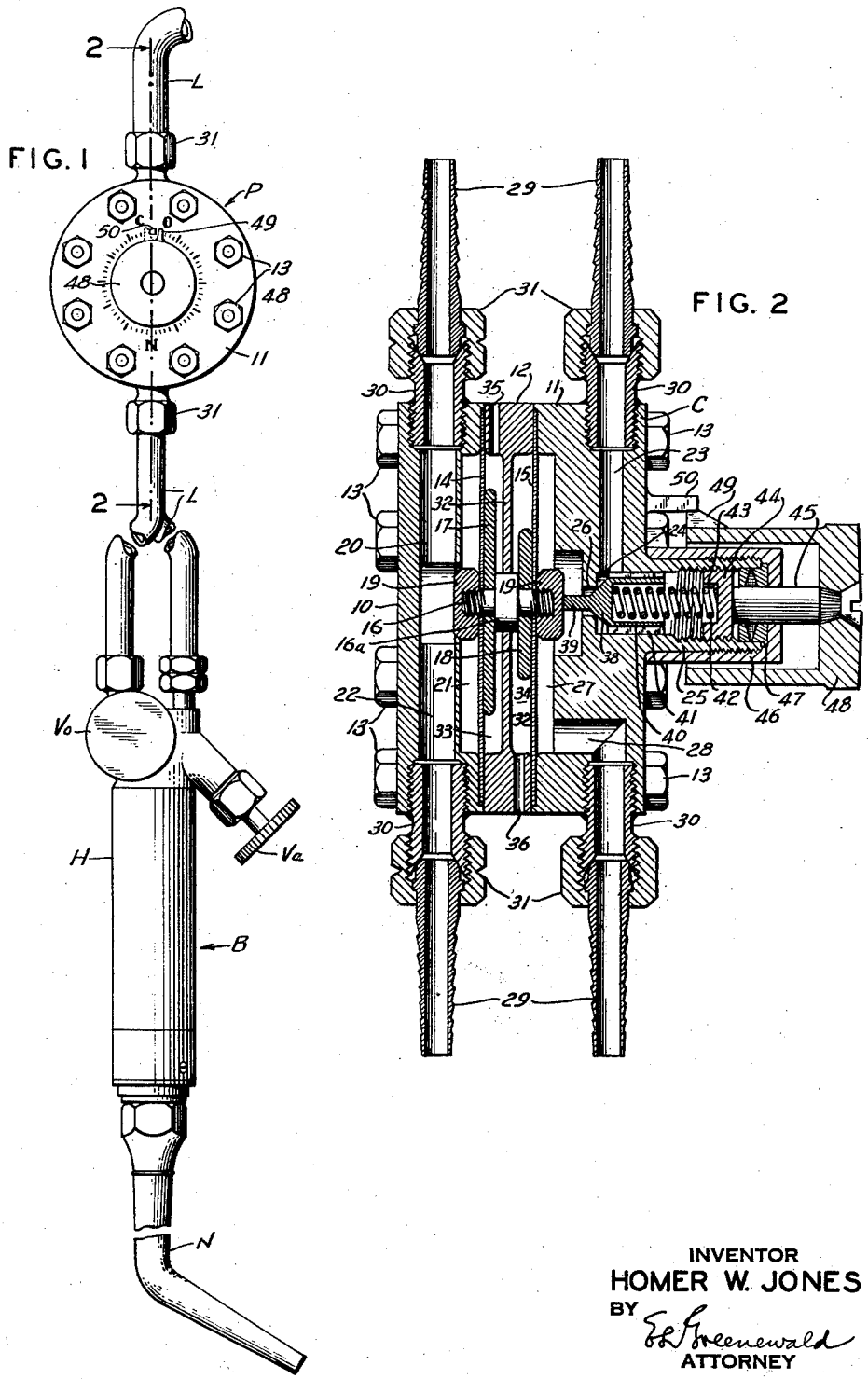
INVENTOR
HOMER W. JONES
BY
ATTORNEY March 5, 1940.  H. W. JONES  2,192,662

GAS REGULATING APPARATUS

Filed April 27, 1938  2 Sheets-Sheet 2

INVENTOR
HOMER W. JONES
BY
ATTORNEY

Patented Mar. 5, 1940

2,192,662

UNITED STATES PATENT OFFICE 2,192,662

GAS REGULATING APPARATUS

Homer W. Jones, Westfield, N. J., assignor to Oxweld Acetylene Company, a corporation of West Virginia Application April 27, 1938, Serial No. 204,497

13 Claims. (Cl. 158—27.4)

This invention relates to gas regulators or proportioners adapted to be used in conjunction with heating and cutting blowpipes, and particularly to oxygen-fuel gas proportioners in which the pressure of one of the gases is regulated by the pressure of the other gas.

Oxygen-fuel gas proportioners which regulate the pressure of one gas by the pressure of the other gas passing therethrough have heretofore generally been pre-adjusted to supply gas in suitable proportion so that a neutral flame only may be produced in the blowpipe. Hence, such proportioners are constructed and set to regulate the pressures of the two gases so that the volumes of oxygen and fuel gas supplied to the blowpipe will have a ratio of approximately one to one. There are times, however, when it is desirable to change the gas ratio so that the gases supplied to the blowpipe will be in suitable proportion to produce either a more oxidizing or a more carbonizing flame, rather than a neutral flame. For example, in some cutting operations and certain welding operations it may be advantageous to employ an oxidizing flame, while in certain heat-treating or flame-hardening operations it may be desirable to utilize a carbonizing flame which will aid in producing the hardening effect in the treated metal. Prior proportioners of this character, however, were incapable of or not intended for adjustment to change the ratio of the gases supplied to the blowpipe.

Moreover, proportioners of this character generally include a single resilient diaphragm, or two resilient diaphragms connected to function in unison. The movements of the single or double diaphragm are governed by the pressure of one of the gases to control the delivery pressure of the other gas by means of a valve provided in the passage for said other gas. With such devices, there is the possibility of leakage of the gases through the diaphragm with a resulting intermingling thereof and liability of explosion.

One of the principal objects of this invention is to provide an improved oxygen-fuel gas proportioner of the character indicated which will avoid the disadvantages and difficulties present in prior proportioners of this type. Other and more specific objects are to provide such a proportioner in which the gas ratios may be changed so as to supply oxygen and fuel gas to a blowpipe in proper proportions to produce either a neutral, carbonizing or oxidizing flame; and to provide such a proportioner in which there is no liability of explosion due to leakage of the gases through the diaphragm.

The above and other objects and novel features of the invention will become apparent from the following description, having reference to the accompanying drawings, in which:

Fig. 1 is a plan view showing an oxygen-fuel gas proportioner embodying my invention inserted in the gas supply lines for an ordinary welding blowpipe;

Fig. 2 is a vertical sectional view through the proportioner shown in Fig. 1, and being taken along the line 2—2 of Fig. 1;

Figure 3:
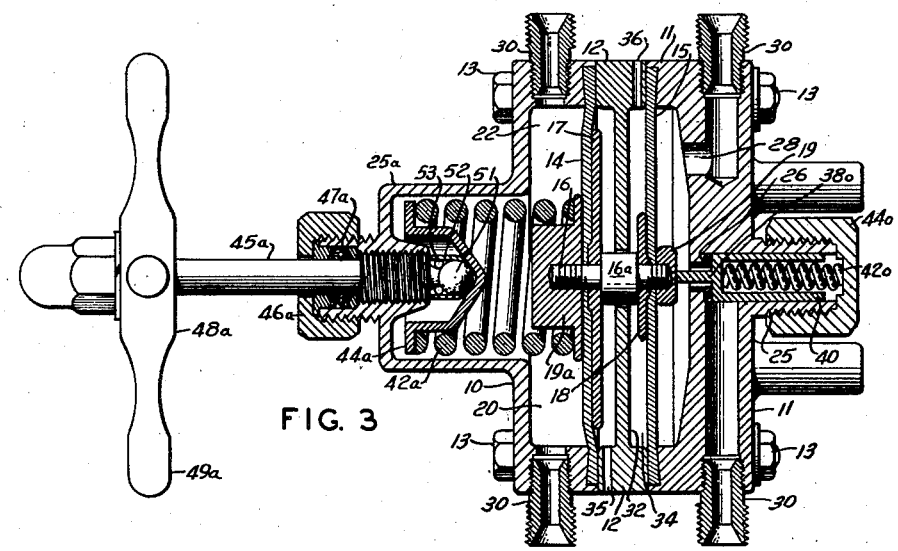
Fig. 3 is a view in section of a modification of my invention, taken on line 3—3 of Fig. 4.

When approximately equal volumes of oxygen and acetylene are burned at the tip of a torch, the flame is said to be neutral and is adapted to produce an extremely high temperature. If, however, the ratio of acetylene to oxygen in the combustible mixture is increased above 1:1, as by increasing the volume of acetylene or decreasing the volume of oxygen, a reducing or carbonizing flame results, which may be used to aid in the production of hardened surfaces. When the ratio of acetylene to oxygen in the mixture is reduced below 1:1, as by increasing the volume of oxygen even a slight amount by a slight increase in pressure, the flame will become oxidizing. Slightly oxidizing flames may be employed in the bronze-welding of steel and cast iron and in certain cutting operations; while heavily oxidizing flames are sometimes utilized when welding brasses and bronzes containing appreciable amounts of lead and tin. Thus, it will be understood that when the pressure of oxygen supplied to a blowpipe of the balanced pressure type, for example, is changed, different types of useful flames may be produced by the blowpipe.

In an oxygen-acetylene proportioner which includes a single resilient diaphragm or a double diaphragm, the pressure exerted against the oxygen side of the diaphragm will be equal to the pressure against the acetylene side thereof. When the oxygen is to be the controlled gas, and a spring-pressed valve is employed in the oxygen passage, there will be three component forces on the oxygen side of the diaphragm which balance the force exerted on the diaphragm by the pressure of the acetylene. These forces are the force exerted by the incoming gas on the inlet side of the valve, the force of the spring and the force exerted on the oxygen side of the diaphragm by the gas flowing through the valve. Since the force exerted on the inlet side of the valve is substantially constant for a predetermined supply pressure and also is very small except for high supply pressures, it will be disregarded in the following description. It will be seen, however, that when a spring is employed on the oxygen side of the diaphragm, the effective diameter of this diaphragm should be less than that of the acetylene diaphragm in order to obtain the proper balance of forces. If resilient diaphragms are employed, the desired difference in the effective diameters may be effected by the utilization of diaphragm plates of different sizes. With such plates the effective diameter of the diaphragm is approximately equal to the mean or average of the diaphragm diameter and the diameter of the plate.

In accordance with the present invention the above outlined principles are utilized for obtaining different gas ratios at the outlet side of a proportioner in which the acetylene pressure is employed to regulate the pressure of the oxygen. One embodiment of the invention includes an acetylene diaphragm, and an oxygen diaphragm having a smaller effective diameter than, and connected to move with, said acetylene diaphragm. The acetylene flows freely through the proportioner but the oxygen flow is under the control of a valve. To compensate for the difference in the effective areas of the diaphragms, and to resiliently hold the valve in its closed position, a spring is provided to bear against the inlet side of said valve. This spring is of suitable dimensions to provide substantially equal pressures of acetylene and oxygen when it is partially compressed, such point of compression being hereinafter referred to as the "neutral point" since with equal pressures the gas mixture is adapted to produce a "neutral" flame. Thus by increasing the pressure of the spring, less oxygen pressure will be required to balance the acetylene pressure and the gases may be supplied to the gas mixer of the blowpipe in proper proportion to produce a carbonizing flame. By decreasing the pressure on the spring a greater oxygen pressure will be required to balance the acetylene pressure and the gases may be supplied in proper proportion to effect an oxidizing flame. The entire construction is such that the device will maintain the gas ratio at which the adjusting wheel is set until the wheel is again moved.

When two resilient diaphragms are employed to effect the desired movement of the oxygen valve, there is always a possibility of the gases leaking through the diaphragm. In accordance with the principles of the present invention, a metal web or inflexible diaphragm is provided between the two resilient diaphragms. This divides the space between the resilient diaphragms into two chambers which are open to the atmosphere. Thus, any acetylene leaking through the diaphragm on the acetylene side of the proportioner will not come in contact with any oxygen which may have leaked through the diaphragm on the oxygen side of the device, and all liability of explosion is eliminated.

Referring now to the drawings, an oxygen-acetylene proportioner P is inserted in the gas supply line L leading to a blowpipe B. The blowpipe shown in the present instance is a conventional balanced pressure type of welding blowpipe having a nozzle N, a handle portion H, and oxygen and acetylene control valves $V_O$ and $V_A$. It will be understood, however, that the proportioner P, due to the provision for changing the gas ratios, is adapted to be employed with other types of blowpipes for cutting, heat-treating and like operations.

As shown in Fig. 2, the proportioner P comprises a main body or casing C which may be made of brass or other suitable material and includes an acetylene or fuel gas body portion 10, an oxygen body portion 11, and a spacer or diaphragm separator 12. The spacer is placed between the two body portions and the entire casing is secured together by means of bolts 13. Mounted between the left-hand side of the spacer 12 and the acetylene body portion 10 is a resilient diaphragm 14, and mounted between the right-hand side of the spacer and the oxygen body portion is a second resilient diaphragm 15. These two diaphragms are connected to move in unison by means of a double connecting screw or stud 16 having a central shouldered portion 16a. Acetylene and oxygen diaphragm plates 17 and 18, respectively, are mounted on either side of the shouldered portion 16a; and nuts 19 are threaded on the ends of the double screw 16 to hold the parts together. It will be observed that the acetylene diaphragm plate 17 is larger than the oxygen plate 18 so that the acetylene diaphragm 14 will have a greater effective diameter than the oxygen diaphragm 15.

Acetylene from a suitable source of supply may enter the proportioner through an inlet passage or conduit 20 which communicates with a compartment or chamber 21 facing the resilient diaphragm 14. The acetylene may leave the proportioner through an outlet passage 22 and flow on through a suitable conduit or hose to the blowpipe B. In a like manner oxygen from the source of supply enters the oxygen side of the proportioner through an inlet passage 23 communicating with a valve chamber 24 which is formed in an outwardly extending cylindrical housing 25 provided on the oxygen body portion 11. An orifice 26 leads from the valve chamber into a compartment 27 facing the second diaphragm 15, and the oxygen may finally leave the proportioner through an outlet passage 28 and pass on to the blowpipe B. All of the gas inlets and outlets may be provided with hose connections 29 which are secured to nipples 30 threaded into the body portion of the apparatus by means of connecting nuts 31.

The spacer 12 is provided with a web or rigid diaphragm 32 which divides the space between the two resilient diaphragms 14 and 15 into acetylene and oxygen compartments 33 and 34, respectively. Passages 35 will allow any acetylene escaping through the diaphragms 14 into the compartment 33 to quickly pass out into the atmosphere. Likewise, passages 36 on the right-hand side of the web 32 allow any oxygen which may leak through the diaphragm 15 to escape into the atmosphere. An aperture is provided in the web 32 so that the shouldered portion 16a may pass therethrough. The clearance around the shouldered portion 16a is very slight, however, so that there will be no tendency for gas to pass from one compartment to another, the passages 35 and 36 providing a ready escape to the atmosphere. In this manner, mixing of the two gases in case of leakage through the resilient diaphragm is prevented.

The flow of acetylene through the proportioner is controlled by the pressure at the source of supply. The flow of oxygen, however, is regulated within the proportioner by means of a coneshaped valve 38 provided in the valve chamber 24 and seating on the edge of the orifice 26. On the left-hand end of the valve 38, as the parts are shown in Fig. 2, there is provided an operating stem 39 which is adapted to be contacted by the face of the nut 19 adjacent the diaphragm 15; while on its right-hand end said valve 38 is provided with a hollow or indented guiding stem 40 having spaced ribs 41 which are adapted to engage the cylindrical walls of the valve chamber 24 to guide the valve in its opening and closing movements. The channels between the ribs 41 provide passages which allow the oxygen to reach and exert a pressure on the inlet side of the valve 38.

The valve 38 is normally seated in the orifice 26 and resiliently held in closed position by means of a helical spring 42 which bears at one end in the hollow or indented portion of the guide stem 40 and at its other end rests in an indenture or hollowed-out portion 43 provided in an adjusting or regulating member 44. This regulating member is threaded so that it may be advanced or retracted within the threaded inside surface of the cylindrical housing 25, to thereby vary the pressure on the spring 42, which is of such dimensions that when it is partially compressed, it will exert sufficient force to compensate for the difference in the effective diameters of the diaphragms when it is desired to deliver the gases at substantially equal pressures for a neutral flame. A stem 45 provided on the regulating member 44 extends to the outside of the proportioner through an aperture provided in a packing nut or cap 46 which is threaded on the end of the extension 25. Suitable packing members 47 may be provided between the regulating member 44 and the cap 46 to prevent any oxygen from leaking to the outside of the proportioner. Removably secured to the end of the stem 45 is an adjusting handle or wheel 48 which, in the present instance, is cylindrical in shape and covers the cap 46. This handle is provided with an indicator 49 which is adapted to cooperate with a pin 50 provided in the face of the oxygen body portion 11 to indicate the radial position to which the handle has been turned.

The face of the casing is calibrated for visual cooperation with the indicator 49 so that the device may be set to deliver a desired ratio of fuel gas to combustion-supporting gas. This is an important feature of my invention. By means of the handle 48 the pointer may be turned to the required ratio, as indicated by the dial, with the result that the proportioner causes a flame having the proper flame characteristic to be delivered by the blowpipe; the proportioner automatically functioning thereafter to maintain constant such characteristic. It will be observed that the valve 38, its actuating means, and the regulating devices are all in axial alignment so that a mechanically efficient and directly acting construction is provided.

The operation of the proportioner is substantially as follows: It will be assumed that the supply pressure of the oxygen is slightly greater than the acetylene pressure which may be from five to fifteen pounds per square inch; and that the handle 48 has been turned a sufficient amount to compress the spring 42 to the neutral point, i. e., the point where the pressure on the oxygen diaphragm 15 will equal the pressure on the acetylene diaphragm 14. Thus, the acetylene entering the proportioner will flow into the chamber 21 and exert a force on the diaphragm 14 causing it to move to the right, as shown in Fig. 2, and hence to open the oxygen valve 38. Oxygen will then flow into the chamber 27 until the pressure therein and on the diaphragm 15 is substantially equal to the pressure on the acetylene side since the handle 48 has been set to provide, in the spring 42, the additional force required to compensate for the difference in the effective areas of the oxygen and acetylene diaphragms. As soon as the pressure in the oxygen diaphragm becomes greater than the acetylene pressure the valve 38 will be closed, because the force exerted by the oxygen pressure on the effective area of the diaphragm plus the force of the spring 42 will then be greater than the opposing force produced by the acetylene on the effective area of the diaphragm 14. As mentioned above, there will also be a force exerted on the inlet side of the valve 38 by the incoming oxygen. However, since this force is very small for oxygen pressures up to fifteen pounds per square inch and remains substantially constant, it will be disregarded in this discussion. With the handle 48 set so that the proportioner will deliver oxygen and acetylene at substantially equal pressures in this manner, the gases supplied to the blowpipe B will be suitable for the production of a neutral flame.

If the handle 48 is turned in a clockwise direction past the point for a neutral flame, the spring 42 will be compressed further. Hence, less pressure on the effective area of the oxygen diaphragm 15 will be required to balance the force produced by the acetylene on the diaphragm 14. Therefore, as the handle 48 is turned in a clockwise direction past the neutral point the delivered oxygen pressure will become less and the gases supplied to the blowpipe will have an increased proportion of acetylene and be adapted to produce a carbonizing flame therein.

When the handle 48 is turned in a counter-clockwise direction past the neutral point, the pressure on the spring will be decreased so that a greater pressure of oxygen will be required to balance the acetylene pressure. In this manner the delivered pressure of the oxygen will be greater than the delivered pressure of the acetylene so that the mixed gases will be adapted to produce an oxidizing flame.

It will thus be apparent that by turning the handle 48 the ratio of the gases supplied to the blowpipe will be changed so that either an oxidizing, neutral or carbonizing flame may be produced. With the construction shown and described the spring 42 may be adjusted so that an oxidizing flame may be produced in which the ratio of oxygen to acetylene is approximately 1.25 to 1; and a carbonizing flame may be produced in which the ratio of oxygen to acetylene is 0.8 to 1. It will be apparent that the device will maintain the ratio at which it is set until the handle 48 is again moved.

Figure 4:
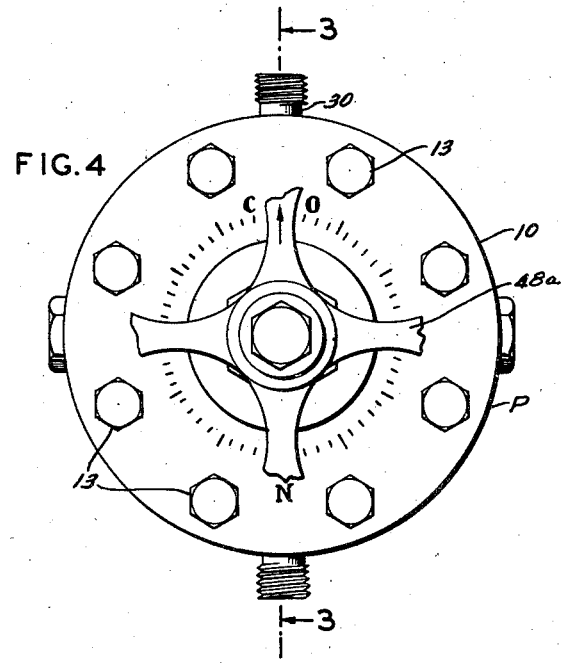
Fig. 4 is a plan view of the modification, parts of the handwheel being broken away for exposing the flame characteristic scale.

If it should be desired to supply the oxygen to the proportioner at high pressure, a spring could be inserted on the acetylene side of the device to augment the force produced by the acetylene on the diaphragm 14. In Figs. 3 and 4 is shown such an arrangement. In the modification springs 42o and 42a are disposed at opposite sides of the diaphragm assembly, the force of spring 42o being adjusted by means of a cap-nut 44o. The force of spring 42a is manually controlled by a handwheel 48a having radial spokes 49a constituting pointers for visual coaction with the dial on the face of the proportioner. The shaft 45a of the handwheel is threaded to the extension 25a to provide a gas tight connection, there being a bearing 44a of conical inner form in which a ball-bearing 51 is seated. Extending from the inner end of the shaft 45a is a ball-bearing cage 52 providing with the ball-bearing 51 a race for small ball-bearings 53. With this arrangement the shaft 45a may be turned easily to change the force of the compression spring 42a.

The operation of the modification is like that described in connection with Figs. 1 and 2. The handwheel is turned to the desired gas ratio by reference to the indicating dial. The device then functions to maintain that ratio for which it is set until the handwheel is again adjusted. The blowpipe thus is caused to deliver a flame that is carbonizing or reducing in the desired degree.

The invention as illustrated in the accompanying drawings and described above is embodied in a separate apparatus which may be inserted in the gas supply line leading to a blow-pipe. It is to be understood, however, that the invention is not restricted to its embodiment in a separate apparatus, but might well be constructed in the handle of the blowpipe. It is also to be understood that, instead of employing diaphragms to effect the movement of the valve in the oxygen side of the apparatus, a pressure-responsive piston might be employed. Moreover, it would also be possible to use a resilient diaphragm in place of the web 32, and in such case a third diaphragm could be attached to the shouldered portion 16a of the connecting screw 16.

Various other changes may be made in the construction, and certain features may be employed without others, without departing from the present invention or sacrificing any of its advantages.

I claim:

1. Gas regulating apparatus for a blowpipe comprising an acetylene conduit; an oxygen conduit; means for regulating the delivery pressure of the oxygen by the service pressure of the acetylene; means cooperating with said regulating means for changing the delivery pressure of the oxygen for any given pressure of the acetylene to thereby vary the delivered ratio of said gases; and flame characteristic-indicating means associated with said last-named means whereby the same may be set to bring about the production at the blowpipe of an oxidizing or a neutral or a reducing flame that is maintained constant in the selected characteristic by virtue of the operation of said regulating means.

2. Gas regulating apparatus for a blowpipe comprising a conduit for fuel gas; a conduit for combustion-supporting gas; means for regulating the pressure of one gas by the pressure of the other gas, so that when the pressure of the one gas changes, the pressure of the other will be changed in proportion; means for changing the amount of one of the gases delivered at a predetermined pressure of the other gas; and flame characteristic-indicating means associated with said last-named means whereby the same may be set to bring about the production of a flame having a predetermined ratio between said fuel gas and said combustion-supporting gas.

3. Gas regulating apparatus for a blowpipe comprising a conduit for acetylene; a conduit for oxygen; a valve in one of said conduits for regulating the amount of gas passing therethrough; pressure-responsive means between said two conduits for controlling said valve through the pressure of gas in said other conduit; means for varying the movement of said valve at any pressure of gas in said other conduit, whereby the ratio of gases delivered from such apparatus may be changed; and flame characteristic-indicating means associated with said last-named means.

4. Gas regulating apparatus for a blowpipe comprising a conduit for acetylene; a conduit for oxygen; a valve in one of said conduits for controlling the amount of gas passing therethrough; pressure-responsive means between said two conduits for controlling said valve through the pressure of the gases in said conduit; means cooperating with said valve for changing the pressure of the controlled gas required to balance the force created by the pressure of the other gas so as to change the ratio of gases delivered from the apparatus; and means for indicating whether the gases delivered to the blowpipe will produce a neutral, oxidizing or carbonizing flame.

5. Gas proportioning apparatus for blowpipes comprising a casing; a passage therein for delivering acetylene; a second passage for delivering oxygen; a valve in one of said passages for controlling the amount of gas passing therethrough; pressure-responsive means in communication with said passages for controlling the movement of said valve; a spring associated with said valve and adapted to resiliently hold it in a closed position; manually controlled means outside such casing for varying the tension of said spring, whereby the pressure of the controlled gas required to balance the force created by the pressure of the other gas may be changed, and an indicator by means of which said manually controlled means may be set to cause a desired ratio of acetylene to oxygen to be delivered by the apparatus.

6. Gas proportioning apparatus for blowpipes comprising a casing having acetylene and oxygen passages therein; a double diaphragm in fluid communication with said passages and having a greater effective area on the acetylene side than on the oxygen side thereof; a valve in the oxygen passage adapted to be opened by the movement of said diaphragm for controlling the flow of oxygen through said passage; resilient means for holding said valve in its closed position and for compensating for the difference in the effective area of the two sides of said diaphragm; means for producing wide variations in the force created by said resilient means so as to vary the oxygen pressure required to balance the movements of the diaphragm, and an indicator by means of which said last-named means may be set to cause a desired ratio of acetylene to oxygen to be delivered by the apparatus.

7. Apparatus for supplying gases to blowpipes and similar apparatus, comprising: an oxygen conduit; an acetylene conduit; a regulating means operated by the service pressure of the acetylene and operating to regulate the service pressure of the oxygen; means indicating flame characteristics of oxidizing, neutral and carbonizing; and manually adjustable means associated therewith for setting said regulating means to bring about the production of a desired flame characteristic; said regulating means thereupon functioning automatically to maintain that ratio of oxygen to acetylene which corresponds to the desired flame characteristic for which said manually adjustable means is positioned relative to said indicating means.

8. Apparatus for supplying gases to blowpipes and similar apparatus, comprising: a gas conduit for conducting one of said gases; a separate conduit for conducting the other of said gases; a regulating means operated by the service pressure of one of said gases and operating to regulate the service pressure of the other of said gases; means indicating flame characteristics for different ratios of said gases; and manully adjustable means associated therewith for setting said regulating means to bring about the production of a desired flame characteristic; said regulating means thereupon functioning automatically to maintain that gas ratio which corresponds to the desired flame characteristic for which it is set.

9. Gas regulating apparatus for blowpipes comprising a conduit for fuel gas; a conduit for combustion-supporting gas; means for regulating the delivery pressure of one gas by the service pressure of the other gas; and means for preventing any mixing of the two gases within such apparatus in case of leakage.

10. Gas regulating apparatus for blowpipes comprises a casing having fuel gas and combustion-supporting gas passages therein; a diaphragm separating said passages; and means for preventing mixing of the gases in case of leakage through said diaphragm.

11. Gas regulating apparatus for blowpipes comprising a casing having acetylene and oxygen passages therein; means responsive to the pressure in the acetylene passage for regulating the delivery pressure of the oxygen and including a first diaphragm movable in response to variations of the pressure of gas in the acetylene passage and a second diaphragm connected to move in unison with said first diaphragm and being spaced therefrom and movable in response to variations of the pressure of gas in said oxygen passage; and means between said two diaphragms for preventing mixing of the gases in case of leakage past said diaphragms.

12. Gas regulating apparatus for blowpipes comprising a casing having acetylene and oxygen passages therein; means responsive to the pressure in the acetylene passage for regulating the delivery pressure of the oxygen, such means comprising a diaphragm in fluid communication with the acetylene passage, and a second diaphragm connected to move in unison with the first diaphragm, and being spaced therefrom and in fluid communication with the oxygen passage; and means for dividing the space between said two diaphragms into two separate compartments so that acetylene passing said first diaphragm will not come in contact with any oxygen which might pass said second diaphragm.

13. Gas regulating apparatus for blowpipes comprising a casing having acetylene and oxygen passages therein; means responsive to the pressure in the acetylene passage for regulating the delivery pressure of the oxygen, such means comprising a diaphragm in fluid communication with the acetylene passage, and a second diaphragm connected to move in unison with the first diaphragm, and being spaced therefrom and in fluid communication with the oxygen passage; means for dividing the space between said two diaphragms into two separate compartments so that acetylene passing said first diaphragm will not come in contact with oxygen passing said second diaphragm; and passages in said casing for allowing any gases in said compartments to escape to the atmosphere.

HOMER W. JONES.